United States Patent [19]
Matsumoto

[11] Patent Number: 5,686,150
[45] Date of Patent: Nov. 11, 1997

[54] CATALYST FORMATION TECHNIQUES

[75] Inventor: Roger Lee Ken Matsumoto, Newark, Del.

[73] Assignee: Lanxide Technology Company, LP, Newark, Del.

[21] Appl. No.: 356,612

[22] Filed: Dec. 15, 1994

[51] Int. Cl.$^6$ ............................................. B05D 3/08
[52] U.S. Cl. ...................... 427/558; 427/212; 427/230; 427/236; 427/259; 427/272; 427/282; 427/333; 427/337; 427/383.1; 427/427; 427/429; 427/443.1; 427/551; 427/552; 427/581; 427/595
[58] Field of Search ..................... 427/443.1, 427, 427/581, 259, 551, 272, 552, 282, 429, 558, 333, 595, 337, 212, 383.1, 236, 230

[56] References Cited

U.S. PATENT DOCUMENTS

| | | | |
|---|---|---|---|
| 3,011,920 | 12/1961 | Shipley | 427/437 |
| 3,615,841 | 10/1971 | Smith et al. | 136/86 |
| 3,615,847 | 10/1971 | Vanleugenhaghe | 136/86 |
| 3,769,090 | 10/1973 | Katz et al. | 136/86 |
| 3,959,017 | 5/1976 | Louis et al. | 136/86 |
| 4,163,811 | 8/1979 | Kohlmayr et al. | 427/115 |
| 4,294,892 | 10/1981 | Alfenaar | 429/13 |
| 4,522,894 | 6/1985 | Hwang et al. | 429/17 |
| 4,732,660 | 3/1988 | Plowman et al. | 204/265 |
| 5,084,144 | 1/1992 | Reddy et al. | 205/104 |
| 5,120,578 | 6/1992 | Chen et al. | 427/304 |
| 5,151,515 | 9/1992 | Cisar | 546/12 |
| 5,346,780 | 9/1994 | Suzuki | 429/42 |

*Primary Examiner*—Bernard Pianalto

[57] ABSTRACT

The present invention relates to a process of depositing metals onto various substrates. Applications for which the present invention may be useful include the formation of catalysts such as those used in electrochemical applications, including fuel cells and the like, refining applications such as oil refining, automotive applications such as automotive catalytic converters, and other similar applications.

17 Claims, 1 Drawing Sheet

CATALYST FORMATION TECHNIQUES

FIELD OF THE INVENTION

The present invention relates to a process of depositing metals onto various substrates. Applications for which the present invention may be useful include the formation of catalysts such as those used in electrochemical applications, including fuel cells and the like, refining applications such as oil refining, automotive applications such as automotive catalytic converters, and other similar applications.

BACKGROUND OF THE INVENTION

In general, catalysts are important because they lower the activation energy of chemical reactions and thereby increase the rate at which such reactions occur. Although catalysts typically may not permit thermodynamically forbidden reactions to occur, the use of catalysts may accelerate thermodynamically permitted reactions by providing new reaction pathways in which, for example, lower-energy activated complexes may form.

Catalysis reactions may be classified broadly as either homogeneous or heterogeneous reactions depending upon a comparison of the phase of the catalyst and the phases of the reactants utilized. In homogeneous catalysis, the catalyst is present as the same phase as the reactants. For example, in the hydrolysis of esters by acids, the catalyst and the reactants are all present as a liquid phase. Further, in homogeneous catalysis, the catalyst typically is combined with the reactants in a mixture and forms an "intermediate reactant", and as such, the catalyst is consumed in one step then reformed in a subsequent step without contributing to the overall net reaction. Heterogeneous catalysis, on the other hand, is characterized by the difference between the phase of the catalyst and the phase of the reactants; most commonly the catalyst comprises a solid and the reactants comprise either liquids or gases. In heterogeneous catalysis, catalytic reactions typically occur at the surface of the catalysts. Moreover, it is typical for catalysts to be located on such various types and configurations of support means. In typical catalyzed reactions, components of a reactant mixture will attach or absorb onto at least a portion of an exposed surface area of the catalyst prior to or during reaction and thereafter detach as a new product, leaving the catalyst substantially intact. The amount of surface area available for reactants to attach or absorb can be of great importance in many reaction systems because, for example, the available surface area may control the rate at which the reaction occurs, and thus, an increase in surface area may increase the rate of the reaction.

Because of its economic importance, catalysis is intensely pursued, and researchers are working continuously to improve catalytic reaction processes. Accordingly, research is ongoing to develop new catalytic structures. With regard to heterogeneous catalysis reactions which utilize a support structure, heterogeneous catalyst structures can be prepared by loading a metal salt solution onto an appropriate support means. Heterogeneous catalysts are typically loaded onto support means such as carbon particles and ceramic oxides, for example, those support means include $TiO_2$, $MgO$, $MgAl_2O_4$, $\gamma-Al_2O_3$, $SiO_2$, and the like. Support means comprising particles may be prepared as fine powders or coarse particles in shapes such as pellets, spheres, granules, rings, tablets, and extrudates. Support means may also comprise simple shapes such as sheets or slabs, or complex shapes such as a honeycomb monolith, where, for example, in the case of catalytic converters, long narrow tubes or channels of ceramic may be coated with alumina or the like, onto which catalyst particles can be loaded.

Commonly utilized methods for loading catalysts onto support means include precipitation, adsorption, ion exchange, and impregnation. Precipitation is typically carried out such that support means comprising powders or particles are mixed into a metal salt solution at a concentration sufficient to obtain the required loading of the metal catalyst onto the support means. An alkali solution may be added to effect precipitation of the metal salt solution, for example, as a metal hydroxide or carbonate, and to cause interaction of the precipitate with the support surface. Numerous steps may be required to control the size of the precipitated particles and the amount of precipitate loaded onto the support.

Adsorption is carried out by exposing support means to metal salt solutions, and the support means typically adsorb some quantity of the salt ions. Adsorption of salt ions from solution may be either cationic or anionic depending on the properties of the support surface.

The ion exchange process for loading a metal catalyst onto a support means is similar to the adsorption process. For example, ion exchange support means have been developed whereby the ion exchange material is prepared with a specific concentration of, for example, sodium, and can be washed with a solution such as ammonium, such that $NH^{+4}$ ions are exchanged with $Na^+$ ions. The treated ion exchange support means can be soaked in a solution containing the metal catalyst, and the metal catalyst may then be loaded onto the ion exchange support means. The extent of metal catalyst loading depends on, among other things, the soaking time and the concentration of sodium on the ion exchange material.

In impregnation processing, metal salt solutions are typically incorporated into pores which are present in support means. The support means can be heated or evacuated to remove moisture in the pores and to accelerate the rate of diffusion of the salt into the pores. Drying is typically required to crystallize the salt on the surface, and may result in irregular concentrations or distributions of the metal salt. Non-uniformity of particle concentration and distribution typically results.

In preparing catalysts, for example, by the techniques discussed above, after the metal salt is deposited onto a support means, the metal salt typically is reduced to an active phase, such as an active phase comprising an oxide or a metal. Thermal decomposition procedures are frequently used to decompose the metal salt to an active phase. Such thermal decomposition procedures typically occur in a reducing atmosphere, such as hydrogen gas. Thermal decomposition procedures may be beneficial only when used in combination with support means which can withstand the temperatures associated with the thermal decomposition process (for example, the support means should not be adversely modified by such thermal decomposition processes). Examples of high temperature materials suitable as support means includes carbon and various ceramic materials. Thus, the effectiveness of the thermal decomposition technique is limited to supports or substrates which can withstand the temperatures associated with thermal decomposition. Thermal decomposition process may be further limiting where the metal catalysts themselves can be adversely affected by high temperatures. For example, high temperature thermal decomposition may result in pooling of the metal catalyst particles such that the surface area of the metal catalysts available for reaction is reduced. A reduction in surface area typically reduces the efficiency and/or rate of the catalytic reaction.

Alternative techniques for decomposing a metal salt into an active phase include direct chemical reducing techniques. Such reducing techniques may comprise reducing agents such as, hydrazine, sodium tetrahydroborate, and the like, which may be used to reduce the metal salt to a metal catalyst. Subsequently, the support means, typically comprising coarse particles or powders which are loaded with the activated metal catalyst, can then be, for example, incorporated into catalytic reactors such as fixed-bed reactors or fluidized-bed reactors, batch reactors, bubble column reactors, continuous stirred-tank reactors, and the like, for any number of commercial uses.

The discovery and the use of catalysts have been significant factors in the growth and success of many industries, particularly the chemical industry which has found economic significance in polymer, pharmaceutical, petroleum and electrochemical applications. In the pharmaceutical and polymer industries, catalysis enables these industries to produce relatively pure products in high yields through such catalytic processes as hydrogenation and isomerization. The petroleum industry has used catalysis to achieve better chemical routes to convert large petroleum molecules into smaller hydrocarbons by a catalytic process known as cracking. Other catalytic processes used in the petroleum industry, such as catalytic reforming, reconstruct or reform gasoline-range molecules, such as those produced through cracking, to improve fuel quality. In electrochemical applications, catalysts are used, for example, in electrodes for both energy consuming and energy producing electrochemical cells, and catalysis proceeds by utilizing metal catalysts which lower the activation energy of the reaction. Among the most notable electrochemical cells is the fuel cell, which has gained attention as an efficient energy conversion device.

Fuel cells are devices which convert energy from chemical reactions directly into electrical energy, and can continue to generate electrical energy as long as fuel for the reaction is provided. In a typical fuel cell, a simple example of which is a hydrogen-oxygen fuel cell, fuel is provided in the form of hydrogen, and is associated with the anode. The anode, typically, is separated from an oxygen source associated with the cathode by an electrolyte medium. Electrical energy is produced by a catalyzed reaction between hydrogen and oxygen which results in the flow of electrons associated with the movement of an ion through an intervening electrolyte medium. Electrons, which are produced by the dissociation of a fuel such as hydrogen, pass from the current collector and flow through the external circuit to the cathode, and protons, formed by the dissociation of fuel, pass through the electrolyte to the cathode. As the flow of electrons through the external circuit is increased, current density is increased.

Generally, the phase of the electrolyte distinguishes solid fuel cells from liquid fuel cells. In liquid fuel cells the electrolyte may be a solution such as sulfuric acid, phosphoric acid, a solution of alkali metal hydroxide, a water solution of salt, or the like. Solid fuel cells are characterized as having solid ionic membranes and comprise materials such as carbon, paper, ceramics or polymers. Solid fuel cells typically exhibit advantages over liquid fuel cells, some of the most important advantages being the lower operating temperatures of the solid cell, longer lifetime, and greater power density.

Solid fuel cells, such as the solid polymer proton exchange membrane fuel cell, typically require a metal catalyst to facilitate the reaction between fuel and oxygen. The metal catalyst facilitates the flow of electrons and the passage of protons through the electrolyte as fuel is dissociated on the surface of the catalyst metal. The efficiency of the fuel cell depends largely on this catalyzed reaction occurring at a desirable rate. Because of the significance of the reaction to the overall efficiency of the fuel cell, the literature is replete with attempts to maximize the efficiency of this reaction.

An example of a method for incorporating metal catalysts into a solid polymer electrolyte fuel cell includes U.S. Pat. No. 5,294,232, which issued on Mar. 15, 1994, in the names of Sakairi, et al. Sakairi et al. teach, among other things, a method of preparing a solid polymer electrolyte fuel cell formed by combining the following: cathode and anode current collectors, a cathode and an anode which contain cathode and anode particles, and an ion exchange membrane. The method comprises reducing a catalyst metal salt in an organic solution of a solid polymer electrolyte, such polymer having properties which are the same as, or similar to, the ion exchange membrane, and depositing the reduced catalyst metal in the solid polymer electrolyte to form the cathode and/or anode. The organic solution of the catalyst metal salt and the solid polymer electrolyte is prepared with a reducing agent, and the catalyst metal salt is reduced in the solid polymer electrolyte mixture. The solvent from the mixture is evaporated, and the remaining polymer and reduced catalyst metal are molded to form the cathode and/or anode. The formed cathode and/or anode is then interposed between the respective current collectors and the ion exchange membrane, and then pressed together to form the fuel cell. If necessary, a support means such as carbon may also be utilized in conjunction with the procedure. According to this process the catalyst metal always exists in the solid polymer electrolyte. The method of U.S. Pat. No. 5,294,232 possesses inherent limitations resulting from the method in which the catalyst is incorporated into the structure of the fuel cell.

In U.S. Pat. No. 4,797,380, which issued on Jan. 10, 1989, in the names of Satoshi Motoo, et al., a method is disclosed for, among other things, producing a highly dispersed catalyst comprising a cross-linking agent with a high polymer substance having a reactive functional group. The high polymer substance, such as polyethylene imine and polyacrylic acid, and a cross-linking agent are mixed in a solvent to cross-link the polymer. The cross-linked high polymer mixed liquid is applied to a carrier, such as carbon, a metallic carbide, a metal, an oxide, carbide or nitride, and dried to remove the solvent and to form a polymer film over the surface of the carrier. The film-coated carrier is impregnated with a metallic complex compound by applying the compound in the form of a solution. The metallic compound is coupled to the reactive functional group of the polymer, and after which the metallic compound is reduced. The reduction of the complex occurs by various techniques including an electrolytic reducing process, a heating process in a hydrogen gas atmosphere, or a chemical reduction with, for example, formic acid, hydrazine, sodium tetrahydroborate, citric acid, oxalic acid, sodium formate, formalin, or methanol. In the method according to this invention, the (metallic) complex compounds are coupled to the reactive functional groups which are substantially uniformly distributed in the high polymer film. Thus, the catalyst particles, which are coupled to the highly reactive polymeric functional groups, are carried in a high dispersion by the carrier. The method of U.S. Pat. No. 4,797,380 possesses inherent limitations resulting from the manner in which the catalyst was dispersed in the polymer of the film-coated carrier.

U.S. Pat. No. 4,407,905, which issued on Oct. 4, 1983, in the name of Seizi Takeuchi, et al., provides for, among other things, a fuel cell having at least one gas diffusion electrode prepared from a noble metal electrode catalyst. Further, there is disclosed a method for improving the deposition of the noble metal particles onto carriers by changing the surface state of the catalyst carriers. A method is disclosed for coating an electron conductive gas-permeable substrate with a catalyst metal supported by a carrier. A mixture comprising an aqueous solution of metal ions, protective colloid, carrier powder, reducing agent, water repellent, carbon fibers, and graphite fluoride, is coated onto the substrate, such as carbon paper. The thus coated electrode is then baked to 310° C.–340° C. to reduce the metal salt to an active phase. The method of U.S. Pat. No. 4,407,905, possesses inherent limitations resulting from the manner in which the metal catalyst is mixed in the coating materials and supported on the carrier.

U.S. Pat. No. 4,876,115 which issued on Oct. 24, 1989, in the name of Raistrick, discloses a method wherein, among other things, gas diffusion electrodes are coated with catalyst metals supported by carbon particles. A proton conducting material is incorporated with the carbon particles and the catalyst metal so that protons are conducted between the catalyst metal supported by the carbon particles, and the solid polymer electrolyte. The method of U.S. Pat. No. 4,876,115 possesses inherent limitations resulting from the manner in which the catalyst is supported on the carbon particles.

The above-discussed compositions and techniques have been briefly addressed herein to give the reader a general understanding of the art. It should be understood that specific variations to the above-discussed compositions and techniques exist. However, conventional methods, such as those discussed above, illustrate broad inherent limitations associated with these techniques. Typically, such inherent limitations include poor utilization of available metal catalyst, and low catalyst efficiency resulting in low current density. For example, in methods where metal catalysts are supported on carbon particle support means, the carbon particles are juxtaposed between the metal catalysts and the electrolyte, such that the transport of the protons from the metal catalysts to the electrolyte may be impeded by the location of the carbon particles, and may result in low current density. Further, in other methods, metal catalyst particles are admixed with a polymer solution, and then solidified such that much of the metal catalyst particles are imbedded in a polymer matrix. Metal catalyst particles which are not exposed to the surface may not be available for reaction with fuel, and thus not all of the available metal catalyst may be utilized. Also, the efficiency by which dissociated protons are transported from the metal catalyst surface to the electrolyte may be decreased, as the protons dissociated on the metal catalyst must be conducted through the polymer matrix to reach the electrolyte. Other methods place metal catalysts either directly onto the surface of a current collector or admixed with a polymer and then coated onto the surface of a current collector. These techniques may result in low proton transport rates and in turn, a lowered current density because protons that are conducted between the metal catalyst on the current collector and the electrolyte may recombine.

Despite prior efforts to increase the efficiency of a fuel cell, there still exists a need to overcome the inheret limitations associated with methods wherein metal catalysts are placed on support means or within a polymer matrix such that the available catalyst metal is not fully utilized. Moreover, there also exists a need to overcome the limitations associated with methods which place the metal catalyst on a support means such that proton transport through the electrolyte is inefficient, and current density is not maximized.

Accordingly, there has been a long felt need for a method of depositing finely divided, uniformly dispersed metal particles onto various substrates. The need is perhaps the greatest for those substrates which cannot withstand the temperature associated with thermal decomposition processes. Thus, those substrates which are typically used in fuel cells can be benefited thus increasing the efficiency of a fuel cell. Such efficiency may be realized by, among other things, increasing the available surface area of the metal catalyst particles, depositing catalysts directly on a substrate without the use of a carbon or polymeric support means, and utilizing substantially all of the metal catalyst provided.

SUMMARY OF THE INVENTION

The present invention relates to a novel process for depositing metals directly onto the surface of an acceptable substrate. Particularly, the present invention is directed to a process for depositing metals onto a substrate which may be suitable, for example, in industrial applications requiring catalytic pathways. In a preferred embodiment of the present invention, the substrate/catalyst combination may be used for electrochemical applications which require metal catalysts to catalyze the required chemical reaction.

A preferred embodiment of the present invention is directed toward the reduction of a metallic compound, such reduction occurring by, for example, an energy source such as electromagnetic radiation. The result of the reduction of the metallic compound is that metal is deposited onto the surface of a substrate (e.g., a polymer substrate). In one particularly preferred embodiment, a mixture is first prepared comprising an aqueous solution of an indirect reducing agent and at least one metal compound. The mixture is applied to at least a portion of a substrate (e.g, a polymer substrate) by any means that results in a substantially uniform coating, and then dried. The dried substrate can be exposed to an energy source (e.g., electromagnetic radiation, such as ultraviolet light) and subsequently rinsed in a developer for a time sufficient to effect a reduction of at least one metallic compound to at least one metal (e.g., a metal or metals from IUPAC groups 8, 9, and 10). The at least one metallic compound can be placed onto the substrate in any desirable pattern by various techniques of the present invention (discussed later herein).

In an alternative embodiment of the present invention, the at least one metallic compound and reducing agent may be applied to at least a portion of the substrate in separate application processes. In another alternative embodiment of the present invention the reducing agent may additionally, or alternately, comprise a direct reducing agent. The application of both indirect and direct reducing agents may be particularly useful where, for example, more than one metallic compound is deposited on the substrate requiring different reduction pathways. Further, the application of direct reducing agent may be beneficial for placing catalysts into or onto certain complex shapes which may be difficult to coat by utilizing only indirect reducing agents.

It has been observed that in the field of photographic printing there exists a technique in which certain metals can be deposited onto a substrate. Such technique incorporates processes used for printing, such as platinum printing. Platinum printing, wherein finely divided platinum metal is deposited on a paper substrate, has been practiced for many years as a method for creating photographic prints. These prints have a visual quality very different from conventional silver gelatin prints, in that the print consists only of platinum metal and paper. As a variant, other metals such as palladium can be used in place of platinum, creating almost the same visual quality. The procedure typically requires a sensitizer solution, which consists of, for example, potassium tetrachloroplatinate and ferric oxalate. The sensitizer solution is coated onto a paper substrate by, for example, brushing or dipping, and the solution is dried. The dried paper is placed under the negative to be printed and the paper is exposed to ultraviolet radiation for a time sufficient for the most transparent portion of the negative to pass enough light for substantially full reaction of the ferric oxalate to ferrous oxalate. Less transparent areas of the negative limit the passage of light, and consequently, there will be less reduction of ferric oxalate to ferrous oxalate; the amount of ferrous oxalate present will determine the density of the deposited platinum. After exposure to ultraviolet light, the paper is submerged into a developing solution, and development takes place almost immediately upon immersion as the ferrous ions reduce the platinum ion to its metallic state. The iron salts are removed by a cleaning process in which the resulting paper is rinsed in dilute acid solutions.

It has been unexpectedly discovered that the photographic technique of platinum printing may be favorably utilized in the field of catalyst formation for depositing metal onto an appropriate substrate. Features of the photographic printing process, which were surprisingly applicable in preparing metal catalysts, overcome difficulties long associated with solid polymer electrolyte fuel cell technology. Such features include: the ability to achieve direct deposition of a reduced metal onto a substrate such as a polymer substrate, without the requirement for carbon support means or polymer matrix support; room temperature processing which facilitates deposition on substrates otherwise incapable of surviving thermal reduction procedures; and the capability of forming any pattern or design of metal catalyst on any compatible substrate by indirect reduction, a concept completely novel to the field of catalyst formation. The unique combination of features of the present invention, as described in detail later herein, provides advances to catalysis which were heretofore unachievable based on the known art in the field.

The methods of the present invention may be used to deposit metals on any number of appropriate substrate materials including, but not limited to, ceramics, ceramic composites, organic and inorganic polymers, or combinations thereof, for use in any number of catalytic operations known to one skilled in the art.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein.

DETAILED DESCRIPTION

Figure 1:
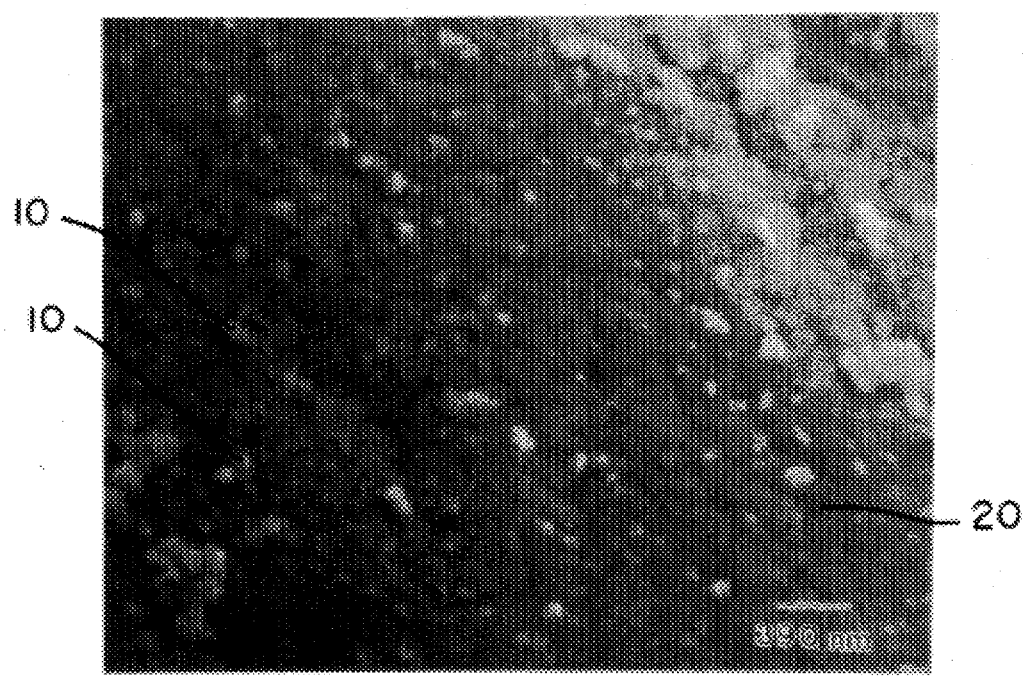
FIG. 1 is a scanning electron micrograph at 25,000X illustrating platinum metal particles deposited onto a section the surface of a Nafion™ substrate.

The present invention relates to a novel process for depositing metals directly onto the surface of an acceptable substrate. Particularly, the present invention is directed to a process for depositing metals onto a substrate which may be suitable, for example, in industrial applications requiring catalytic pathways. In a preferred embodiment of the invention, the substrate/catalyst combination may be used for electrochemical applications which require metal catalysts to catalyze the required chemical reaction.

A preferred embodiment of the present invention comprises the formation of a fuel cell comprising an anode, a cathode, an electrolyte, fuel and an oxidant, in which a metal catalyst directly contacts at least a portion of the surfaces of the anode, cathode, and/or electrolyte.

A preferred embodiment of the present invention is directed toward the reduction of a metallic compound by a reducing agent, in the presence of electromagnetic radiation. The reduction of the metallic compound is such that the metal is deposited onto the surface of a substrate (e.g., a polymer substrate). In a preferred embodiment of the present invention, a mixture is first prepared comprising an aqueous solution of a reducing agent and at least one metallic compound. As used here in, the term "metallic compound" means a composition consisting of at least one metal, such as potassium tetrachloroplatinate (II). The mixture is applied to a substrate (e.g., a polymer substrate) by any means that results in a substantially uniform coating, and then dried either in air atmosphere furnace, at relatively low temperatures (e.g., about 80° C. to about 100° C.). The dried substrate can then be exposed to an energy source (e.g., electromagnetic radiation, such as ultraviolet light) and rinsed in a developer for a time sufficient to effect a reduction of the metallic compound. The reduced metal is present on the substrate in a pattern consistent with the exposure of the substrate to electromagnetic radiation.

In the preferred embodiment of the present invention comprising a fuel cell, the metal catalyst may be located at least on at least one side of at least one substrate such as the anode, cathode, and/or electrolyte. Further, the metal catalyst is located substantially completely on the surface of said at least one substrate such that the metal catalyst is deposited onto the surface without a support means such as carbon or polymer particles or polymer matrix.

The mixture comprising a reducing agent and at least one metallic compound may be applied onto the substrate by any number of methods, such as dipping, spraying, brushing, etc. In a preferred embodiment, the mixture comprises an aqueous solution of at least one metallic compound and at least one reducing agent. However, any solution in which the reducing agent and the metallic compound are soluble, and which does not adversely affect the reduction reaction or the substrate, is suitable for the purposes of this invention. The mixture may be applied uniformly to at least a portion of the substrate, or, alternatively, the mixture may be applied by varying the concentration of the application or the number of applications, over the substrate. Greater concentrations or numbers of applications of the metallic compound and reducing agent mixture, typically, result in increased deposition of the metal catalyst on the substrate.

In an alternative embodiment of the present invention, the reducing agent and at least one metallic compound may be introduced to the substrate in separate processing steps. For example, a mixture comprising the reducing agent may be first applied to at least a portion of said substrate, and subsequently, a mixture comprising at least one metallic compound may be applied to at least a portion of the substrate. Alternatively, a mixture comprising at least one metallic compound may be applied to at least a portion of said substrate, and subsequently a reducing agent may be introduced to reduce the at least one metallic compound to metal catalyst.

Reducing agents suitable for use in the present invention may include at least one indirect reducing agent and at least one direct reducing agent. Indirect reducing agents typically require at least one additional processing step, such as, for example, exposure to electromagnetic radiation or thermal exposure, to achieve the reduction of metals. For example, an indirect reducing agent such as ferric oxalate is first reduced to ferrous oxalate upon exposure to ultraviolet light, and subsequently the ferrous oxalate is oxidized back to ferric oxalate to effect reduction of metallic compounds to metals. Alternatively, direct reducing agents also may be used, and such compounds may include any direct reducing agent known to one skilled in the art, such as hydrogen gas, carbon monoxide, hydrazine, sodium tetrahydroborate, and the like. Processes utilizing direct reducing agents typically may be sufficient to cause a reduction of a metallic compound to a metal without the need for the additional processing steps used in indirect reduction, such as exposure to an energy source (e.g., electromagnetic radiation). A particularly preferred direct reducing compound for metals comprises ferrous oxalate which upon oxidation to ferric oxalate reduces metallic compounds to metals. When using indirect or direct reducing agents, immersing the substrate in developer may be necessary to achieve a reduction of metallic compounds, depending on the reducing agent used. The term "developer" means a composition in which the reducing agent is typically oxidized in the presence of metallic compounds to effect reduction to metals.

In an alternative embodiment of the present invention, both direct and indirect reducing agents may be used, for example, where more than one metallic compound is deposited onto a substrate requiring different reduction pathways. Further, the application of direct reducing agents may be beneficial for placing catalysts into or onto certain complex shapes which may be difficult to coat by utilizing only indirect reducing agents. Thus, it is possible to coat complex shapes with direct reducing agents to provide catalysts in locations where the combination of indirect reducing agent and electromagnetic radiation is not practical.

In a preferred embodiment of the present invention when using indirect reduction, exposure of a substrate to an energy source (e.g., electromagnetic radiation) may be manipulated for the purpose of controlling the amount of metals deposited as well as the location of the metals deposited. For instance, when using ferric oxalate, the length of time and intensity of exposure to ultraviolet radiation may be increased or decreased to correspondingly increase or decrease the amount of metal deposited on an exposed substrate. Further, exposure of a substrate to an energy source (e.g., electromagnetic radiation) may be such that all or only a part of the substrate is exposed, thereby permitting the formation of a desired pattern of metal deposition on specific portions of a substrate. Partial exposure of a substrate may proceed as a process of masking or focusing exposure. The term 'masking' means shielding from exposure that part of a substrate on which less metal deposition or no metal deposition is desired. For example, masking may be accomplished by placing a barrier or other form of interference, through which electromagnetic radiation is impeded, between the source of electromagnetic radiation and a substrate. A barrier may be formed, for example, such that a pattern is created to allow exposure only of specific portions of a substrate. In a preferred embodiment of the present invention, masking may be accomplished to achieve a deposition of metal in complex patterns. The term 'focusing' means, exposing to an energy source such as electromagnetic radiation, a certain portion of a substrate on which metallic deposition is desired. In a preferred embodiment, focusing may be accomplished by using a narrow beam of radiation, for example, to write or print a pattern onto a substrate so that metal is deposited only at those sites of exposure, and no metal is deposited on the unexposed parts of the substrate.

Metals particularly suitable for use in the methods of the present invention include such metals as nickel, iron, gold, copper, palladium, platinum, rhodium, ruthenium, osmium, iridium, and alloys thereof. Preferred metals, for use as catalysts include, for example, those belonging to IUPAC groups 8, 9, and 10. Particularly preferred metals include platinum, palladium, and ruthenium. Metallic compound solutions may be prepared in concentrations tailorable to achieve a desired dispersion of metal particles deposited onto a substrate. In a preferred embodiment of the present invention, dilute solutions of metallic compounds are prepared resulting in the deposition of fine, well dispersed metal particulates. In a particularly preferred embodiment, metals may be deposited onto selected portions of a substrate, by, for example, spraying or painting metallic compounds so as to form a pattern.

Further, metals may be applied in layers to achieve a dense dispersion of fine particles. Alternatively, metals may be applied in sufficient concentrations so that a deposition of connected metal particles across the surface of a substrate results. Additionally, combinations of metals may be used so that more than one metal may be included in a mixture to be deposited onto a substrate. In another alternative embodiment of the present invention, more than one metal may be selectively applied so that the more than one metal is uniformly or selectively deposited onto a substrate. Further, metals may be applied individually so that one or more metals is applied to specific portions of a substrate and an alternate selection of one or more metals is applied individually to the same or different portions of the substrate on which the first one or more metals is applied.

Developers suitable for the practice of the present invention may be in the form of, for example, liquid solutions, aerosols, and the like. Preferred developers are solutions prepared from compounds including, but not limited to, oxalates, such as potassium oxalate and sodium oxalates, citrates such as sodium citrate and potassium titrate, acetates such as sodium acetates and potassium acetate, citric acid, and the like, and dilutions and mixtures, thereof. A developer may also comprise water. Developers may be applied to the substrate by any method such as dipping, spraying, brushing, and the like. In a preferred embodiment of the present invention, a substrate onto which the mixture has been applied and dried may be immersed in the developer for a time sufficient for metals to reduce, with reduction usually occurring substantially immediately.

Substrates suitable for the purposes of the present invention include, but are not limited to inorganic polymers, natural and man-made organic polymers, hybrid polymers, carbons, ceramics, ceramic composites, and combinations thereof. Preferred substrates include carbons and polymers, such as polyetheretherketone, Nation™ (a fluoropolymer), ABS, polyethylene, polypropylene, polysulfone, and the like. Suitable polymers may also include inorganic polymers such as those capable of being converted to ceramic, for example, polysilazanes, polyureasilazanes, polythioureasilazanes, polysiloxanes, and polyalazanes. Carbon materials suitable for use in this application include, but are not limited to amorphous carbon, graphite, and carbon felt sheets.

Geometries of the substrates which may be suitable for the purposes of the present invention include, but are not limited to, coherent bodies and three dimensional objects, such as films, sheets, papers, extrudates, fibers, tubes, bubbles, spheres, microspheres, granules, plates, particulates, whiskers, powders, rings, tablets, or complex figures, and the like. Single substrates or a multiplicity of substrate geometries and compositions may be desirable depending on a specific use. For example, substrate geometries such as papers, sheets, and coherent bodies, may comprise, for example, natural and man-made organic or inorganic polymeric fibers including, for example, cellulose, ceramic and glass, which may be held together with binders, such as organic or inorganic polymeric binders, and may further comprise particulate materials, to be formed into desirable geometries.

Though not required for the present invention, and depending on the particular substrate utilized it may be desirable to modify the substrate surface for greater adherence of the deposited metal. For example, a substrate surface may be modified chemically using compounds such as acids, bases and solvents. Examples of such acids include sulfuric, nitric, hydrochloric, and phosphoric acids. Further, the substrate may be abraded mechanically using for example, sand paper or sand blasting. In a preferred embodiment, modification of the substrate surface may create surface porosity such that the surface area of the substrate is increased, creating greater surface area for metal catalyst to deposit.

In another preferred embodiment of the present invention, the process comprising the steps of placing the mixture onto a substrate, drying the substrate, exposing and developing the substrate may proceed in either a batch or a continuous process. In a preferred embodiment, depending on the form of the catalyst system desired, the present invention may be uniquely suited to processing a single system or multiple systems at one time, sometimes referred to as batch processing. In an alternative embodiment of the present invention, a continuous process may occur where the substrate is a continuous film, utilizing a set-up similar to that used in some newspaper printing operations.

Various demonstrations of the present invention are included in the Examples immediately following. However, these Examples should be considered illustrative only and should not be construed as limiting the scope of the invention as defined in the appended claims.

EXAMPLE 1

The present example demonstrates, among other things, the process of depositing a platinum metal onto a polymer substrate. A polymer film, poly(etheretherketone) (PEEK, Westlake Plastics, Lenni, Pa.), measuring about 2.5 cm×7.5 cm×0.01 cm was prepared by dipping into concentrated sulfuric acid for about 5 to 10 seconds (or until the film turned a light tan color) at room temperature. The film was rinsed immediately in water at ambient temperature until the surface of the film turned a cloudy white. An aqueous mixture of potassium tetrachloroplatinate (II) and ferric oxalate was prepared by dissolving about 5 grams of tetrachloroplatinate (II) (Johnson Matthey, Ward Hill, Mass.) in about 30 ml of water, and mixing the solution with an equal volume of a 20 % by weight solution of ferric oxalate (Photographers Formulary, Condon, Mont.). The prepared film was then dipped into the aqueous mixture of tetrachloroplatinate and ferric oxalate, and dried at room temperature. The film was then placed about 1 inch from an ultraviolet radiationsource (two 15W uncoated fluorescent tubes) and exposed for a time sufficient to change the ferric oxalate to ferrous oxalate (the dried deposit turned from light brown to a darker brown). After exposure, the film was submerged into a saturated aqueous sodium acetate solution (about 100 grams of sodium acetate dissolved in about 500 grams of water) at room temperature until the brown deposit turned a dark gray, indicating the reduction of platinum to its metallic form, and then rinsed with water at room temperature for about 3 to 4 minutes. SEM examination at about 10,000X magnification showed that substantially the entire PEEK surface was covered with adherent, discrete platinum particles less than about 0.1 µm in size, with occasional clusters up to about 1 µm that do not appear to be adherent. The PEEK surface appeared to have surface porosity and the platinum particles deposited inside the pores as well as on the surface of the substrate.

EXAMPLE 2

The present example demonstrates, among other things, the process of depositing platinum metal onto a polymer substrate. Example 1 was substantially repeated except that the PEEK film was prepared by dipping the film into concentrated nitric acid for about 30 seconds (or until the film changed from a clear to a light tan color). The film was rinsed and treated with the solutions used in Example 1, and in the same manner. The surface of the substrate was a lighter gray then Example 1, which indicated that the concentration of platinum metal particles deposited on the substrate was less than that of Example 1.

EXAMPLE 3

The present example demonstrates, among other things, the process of depositing platinum metal onto a polymer substrate. Example 1 was substantially repeated except that the PEEK film was prepared by dipping the methylene chloride for about 15 seconds (or until the film surface became cloudy and started to deform), instead of dipping the film in sulfuric acid. The prepared film was immediately dipped in the platinum solution, and processed as in Example 1. The surface of the substrate had a light gray appearance which indicated that platinum metal deposited on the surface with the concentration of particles less than that of Example 1.

EXAMPLE 4

The present example demonstrates, among other things, the process of depositing a platinum metal onto a polymer substrate. Example 1 was essentially repeated except the PEEK film was prepared by dipping in concentrated sulfuric acid for a longer time (for about 30 seconds). The surface of the substrate was a lighter gray than that of Examples 1, 2 and 3, indicating that platinum metal was deposited on the surface of the substrate in a much lower concentration than Example 1.

EXAMPLE 5

The present example demonstrates, among other things, the deposition of platinum metal on the surface of a polymer substrate. The PEEK film was prepared in sulfuric acid essentially the same as Example 1. An aqueous mixture of tetrachloroplatinate (II) and ferric oxalate was prepared as in Example 1. The platinum-containing solution was exposed to an ultraviolet radiationsource for a time sufficient to change the ferric oxalate to ferrous oxalate (the deposit turned from a light brown to a darker brown), and then the prepared PEEK film was dipped into the solution. The film was dried then rinsed in saturated aqueous sodium acetate solution, but was not exposed to ultraviolet light. Platinum metal deposited onto the surface of the polymer in a concentration lower than that of Example 1 which was indicated by the light gray appearance of the surface substrate.

EXAMPLE 6

The present example demonstrates, among other things, the process of depositing platinum metal onto a polymer substrate. A polymer film, Nafion™ (DuPont, Wilmington, Del.), measuring about 2.5 cm×7.5 cm×0.01 cm was rinsed with the aqueous mixture of potassium tetrachloroplatinate (II) and ferric oxalate used in Example 1, and treated in substantially the same manner, except that instead of dipping the film in the potassium tetrachloroplatinate (II) and ferric oxalate solution, the film was soaked for about 2 minutes. After which the film was dried and exposed to ultraviolet light, and immersed in a sodium citrate solution as per Example 1. The substrate surface was a light gray indicating that a lower concentration of platinum metal was deposited on the surface of the substrate than was deposited in Example 1.

EXAMPLE 7

The present example demonstrates, among other things, the process of depositing platinum metal onto a polymer substrate. Example 6 was essentially repeated except that the Nafion™ film (Dupont, Wilmington, Del.) was treated with sulfuric acid and rinsed in hydrogen peroxide prior to dipping the film in the aqueous mixture of potassium tetrachloroplatinate (II) and ferric oxalate solution. A high concentration of platinum metal deposited uniformly to the surface of the substrate was apparent by the dark gray color of the substrate. FIG. 1 shows a SEM examination at about 25,000X which reveals finely divided, uniform platinum particles (10) generally less than about 100 nm in size, on a Nafion™ substrate (20).

EXAMPLE 8

The present example demonstrates, among other things, the process of depositing platinum metal onto the Nafion™

Figure 2:
FIG. 2 is a scanning electron micrograph at 25,000X illustrating platinum metal particles deposited onto a section of the surface of a Nafion™ substrate.

(DuPont, Wilmington, Del.) substrate. Example 7 was substantially repeated except that the aqueous mixture of potassium tetrachloroplatinate (II) and ferric oxalate was diluted to about a 10% by volume solution in deionized water. The substrate was a lighter gray then Example 7 indicating that the platinum metal deposited onto the surface of the substrate in a lower concentration than Example 7. FIG. 2 shows a SEM examination at about 25,000X which reveals freely divided, uniform platinum particles (30) on the surface of a Nafion™ substrate (40).

EXAMPLE 9

The present example demonstrates, among other things, the process of depositing platinum metal onto the Nafion™ (DuPont, Wilmington, Del.) substrate. The substrate, measuring about 2.5 cm×7.5 cm×0.01 cm was dipped into concentrated sulfuric acid for a time sufficient to wet the film, and was then rinsed in water. Example 6 was substantially repeated. Platinum metal was deposited on the film in a concentration less than that achieved in Example 7 which was indicated by the lighter gray color of the substrate. SEM examination at about 25,000X showed platinum metal particles of dimensions less than about 100 nm, with particles occurring both singly and in clusters.

EXAMPLE 10

The present example demonstrates, among other things, the process of depositing platinum metal onto a polymer substrate. Example 8 was substantially repeated except that the Nation™ (DuPont, Wilmington, Del.) film was dipped into the dilute solution of tetrachloroplatinate (II) and ferric oxalate for about 5 minutes. Platinum metal deposited on the substrate and was more concentrated than the metal deposit in Example 8, but less concentrated than Example 7, as was indicated by an intermediate gray color of the substrate. SEM at about 25,000X showed widely scattered platinum particles. The platinum particles have dimensions of less than about 100 nm and appeared to be separated by about 200 nm.

I claim:

1. A method for depositing at least one metal catalyst onto at least a portion of at least one substrate, said method comprising the steps of:

placing onto at least a portion of at least one substrate, at least one mixture comprising at least one metallic compound and at least one indirect reducing agent;

exposing at least a portion of said at least one substrate having said at least one mixture thereon to an energy source;

contacting at least a portion of said at least one substrate with at least one developer to permit reduction of said at least one metallic compound.

2. The method of claim 1, wherein said energy source comprises electromagnetic radiation.

3. The method of claim 2, wherein said electromagnetic radiation comprises ultraviolet radiation.

4. The method of claim 1, wherein said at least one substrate comprises at least one material selected from the group consisting of polyetheretherketone, Nafion™, ABS, polyethylene, polypropylene, polysulfone, polysilazane, polyureasilazane, polythioureasilazane, and polyalazane.

5. The method of claim 1, wherein said energy source comprises thermal energy.

6. A method for forming at least one component of a solid polymer electrolyte fuel cell comprising, depositing at least one metal catalyst onto at least a portion of at least one polymer substrate, said method comprising the steps of:

placing onto at least a portion of said at least one polymer substrate, at least one mixture comprising a material comprising ferric oxalate and at least one metallic compound comprising at least one element selected from the group consisting of platinum, palladium, and ruthenium;

exposing at least a portion of said at least one polymer substrate having said at least one mixture thereon to a source of electromagnetic radiation;

contacting at least a portion of said at least one polymer substrate with at least one developer to permit reduction of said at least one metallic compound.

7. The method of claim 6, wherein said placing said mixture onto at least a portion of said at least one polymer substrate comprises painting.

8. The method of claim 6, wherein at least a portion of said at least one polymer substrate comprises at least one material selected from the group consisting of inorganic polymers and organic polymers.

9. The method of claim 6, wherein said at least one substrate comprises at least one material selected from the group consisting of polyetheretheketone, Nafion™, ABS, polyethylene, polypropylene, polysulfone, polysilazane, polyureasilazane, polythioureasilazane, and polyalazane.

10. The method of claim 6, wherein said at least one polymer substrate comprises coherent bodies.

11. The method of claim 6, wherein said at least one developer comprises at least one material selected from the group consisting of water, oxalate, sodium acetate, sodium citrate, and citric acid.

12. The method of claim 6, wherein said source of electromagnetic radiation comprises ultraviolet radiation.

13. The method of claim 6, wherein said exposing at least a portion of said at least one polymer substrate comprises at least one technique selected from the group consisting of masking and focusing.

14. The method of claim 6, further comprising providing at least one direct reducing agent in combination with said at least one mixture.

15. The method of claim 6, wherein said placing said mixture onto at least a portion of said at least one polymer substrate comprises at least one method selected from the group consisting of dipping, spraying, and brushing.

16. The method of claim 6, wherein said at least one polymer substrate comprises at least one geometry selected from the group consisting of plates, films, sheets, particulates, tubes, and spheres.

17. The method of claim 6, wherein said at least one polymer substrate comprises at least one geometry selected from the group consisting of papers, granules, powders, fibers, microspheres, and bubbles.

* * * * *